United States Patent
Kuo et al.

(10) Patent No.: US 12,024,162 B2
(45) Date of Patent: Jul. 2, 2024

(54) AUTOMATIC EMERGENCY BRAKING FOR A PATH-CROSSING TARGET

(71) Applicant: Aptiv Technologies AG, Schaffhausen (CH)

(72) Inventors: Wen-Yu Kuo, Ann Arbor, MI (US); Yu Han, Farmington Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 198 days.

(21) Appl. No.: 17/407,049

(22) Filed: Aug. 19, 2021

(65) Prior Publication Data
US 2023/0054608 A1 Feb. 23, 2023

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 30/0953* (2013.01); *B60W 40/107* (2013.01); *B60W 2554/4041* (2020.02)

(58) Field of Classification Search
CPC .. B60W 30/09; B60W 10/18; B60W 30/0953; B60W 40/107; B60W 2554/4041; B60W 2520/06; B60W 2520/105; B60W 2540/229; B60W 2554/40; B60W 2554/4043; B60W 2554/4049; B60W 2554/408; B60W 2554/801; B60W 2554/806; B60W 2710/18;
(Continued)

(56) References Cited

U.S. PATENT DOCUMENTS 6,624,782 B2  9/2003  Jocoy et al.
8,942,904 B2  1/2015  Foerster et al.
(Continued)

FOREIGN PATENT DOCUMENTS

WO   2021023463 A1   2/2021

OTHER PUBLICATIONS

"Extended European Search Report", EP Application No. 22179783.0, dated Nov. 21, 2022, 8 pages.

*Primary Examiner* — Angelina Shudy
*Assistant Examiner* — Mohamed Abdo Algehaim
(74) *Attorney, Agent, or Firm* — Harness, Dickey & Pierce, P.L.C.

(57) ABSTRACT

Techniques are described that enable automatic emergency braking (AEB) for a path-crossing target when a collision between a host vehicle and the target that is deemed imminent. Based on whether an acceleration of the host vehicle is above a threshold. Based on the acceleration, and, optionally, a location of the target relative to a crossing path (e.g., whether a portion of the target is within a suppression zone), an AEB system of the host vehicle is either activated or not activated, for example, suppressed. This suppression of the AEB system may include gating or nulling an AEB activation signal to prevent an emergency braking event. By managing the AEB system in a path-crossing scenario, many common false-positive AEB events (warnings, alerts, and/or braking) may be avoided. Furthermore, intentional vehicle maneuvers that comply with normal driving etiquette or rules can still be allowed for operator and passenger comfort, without risking safety.

20 Claims, 5 Drawing Sheets

(51) Int. Cl.
*B60W 30/095* (2012.01)
*B60W 40/107* (2012.01)

(58) Field of Classification Search
CPC ......... B60W 30/0956; B60W 30/18154; B60T 2201/022; B60T 7/22
USPC ...................................................... 701/7, 70
See application file for complete search history.

(56) References Cited

U.S. PATENT DOCUMENTS

| | | |
|---|---|---|
| 9,177,477 B2 | 11/2015 | Mochizuki |
| 10,220,845 B2 | 3/2019 | Al-Stouhi |
| 2010/0023226 A1* | 1/2010 | Ito ........................ B60R 21/0134 701/46 |
| 2013/0179047 A1* | 7/2013 | Miller .................. B60W 30/09 701/70 |
| 2014/0149013 A1* | 5/2014 | Matsuno ................. B60R 21/00 701/70 |
| 2014/0372003 A1* | 12/2014 | Ly .......................... B60K 28/06 701/70 |
| 2016/0155334 A1 | 6/2016 | Jansson |
| 2016/0332569 A1* | 11/2016 | Ishida ................... B60W 50/16 |
| 2016/0362104 A1* | 12/2016 | Miller ................... B60W 30/09 |
| 2018/0043885 A1* | 2/2018 | Harada ................. B60W 10/06 |
| 2019/0001973 A1* | 1/2019 | Matsunaga ....... B60W 30/0956 |
| 2019/0263344 A1* | 8/2019 | Yokoi ................. B60W 30/095 |
| 2019/0375382 A1* | 12/2019 | Nakatsuka ...... B60W 30/18109 |
| 2020/0086854 A1* | 3/2020 | Liu ................... B60W 30/0956 |
| 2020/0097739 A1* | 3/2020 | Hashimoto ....... B60W 30/0956 |
| 2020/0216060 A1* | 7/2020 | Pontisakos ............ B60W 10/20 |
| 2020/0247398 A1* | 8/2020 | Miyamoto ............ G01S 13/867 |
| 2021/0229656 A1* | 7/2021 | Dax ................... G08G 1/09626 |
| 2022/0144262 A1* | 5/2022 | Weiss ................. B60W 30/095 |
| 2022/0144263 A1* | 5/2022 | Weiss ................. B60W 30/0953 |
| 2022/0281443 A1* | 9/2022 | Sung ..................... B60W 40/08 |

* cited by examiner

AUTOMATIC EMERGENCY BRAKING FOR A PATH-CROSSING TARGET

BACKGROUND

Driver-assistance technologies are being developed and integrated in vehicles to increase safety. Automatic emergency braking (AEB) is one driver-assistance technology that enables vehicles to automatically slow or stop to avoid collisions with other vehicles or objects. To promote maximum safety, traditional AEB is often activated in low-risk situations where it is not necessary (e.g., circumstances change, the activation is based on a false-positive collision indication). One common false-positive situation is a crossing scenario where a target vehicle is crossing a path of a host vehicle. For example, when the host vehicle and the target vehicle stop at a four-way stop, the target vehicle will often cross in front of the path of the host vehicle. In such a situation, a driver of the host vehicle may wish to aggressively cross the intersection as soon as the target vehicle has cleared the path of the host vehicle. If they do, traditional AEB functions may be activated (e.g., an alert activated, a braking force applied) even though a risk of collision is low (e.g., the driver may be confident that the target will be out of the way by the time the host vehicle crosses the path taken by the target vehicle). Activating AEB in low-risk scenarios may cause unnecessary vehicle movements, which can be uncomfortable and frustrating for a driver and passengers. Furthermore, such movements can be potentially dangerous for other vehicles that do not anticipate an unnecessary emergency maneuver.

SUMMARY

Apparatuses and techniques enabling AEB for a path-crossing target are described below. Some aspects described below include a method. The method includes receiving an AEB activation signal indicating a potential collision between a vehicle and a target that is crossing a path of the vehicle. The method also includes determining whether an acceleration of the vehicle is above an acceleration threshold. Based on whether the acceleration of the vehicle is above the acceleration threshold, the method includes determining whether to allow or not allow the AEB activation signal.

Other aspects described below include a system. The system comprises at least one processor configured to receive an AEB activation signal indicating a potential collision between a vehicle and a target that is crossing a path of the vehicle. The processor is also configured to determine an acceleration of the vehicle. Responsive to a determination that the acceleration of the vehicle is not at or above an acceleration threshold, the processor is configured to allow the AEB activation signal. Alternatively, responsive to a determination that the acceleration of the vehicle is at or above the acceleration threshold, the processor is configured to determine whether a portion of the target is within a suppression zone of the vehicle. Responsive to a determination that the portion of the target is within the suppression zone, the processor is configured to not allow the AEB activation signal. Responsive to a determination that the portion of the target is not within the suppression zone, the processor is configured to allow the AEB activation signal.

Further aspects described below include at least one non-transitory computer-readable storage medium. The non-transitory computer-readable storage medium comprises instructions configured to cause at least one processor to receive an automatic emergency braking (AEB) activation signal indicating a potential collision between a vehicle and a target that is crossing a path of the vehicle. The instructions are also configured to cause the processor to determine an acceleration of the vehicle. Responsive to a determination that the acceleration of the vehicle is not at or above an acceleration threshold, the instructions are configured to cause the processor to allow the AEB activation signal. Alternatively, responsive to a determination that the acceleration of the vehicle is at or above the acceleration threshold, the instructions are configured to cause the processor to determine whether a portion of the target is within a suppression zone of the vehicle. Responsive to a determination that the portion of the target is within the suppression zone, the instructions are configured to cause the processor to not allow the AEB activation signal. Responsive to a determination that the portion of the target is not within the suppression zone, the instructions are also configured to cause the processor to allow the AEB activation signal.

BRIEF DESCRIPTION OF THE DRAWINGS

Apparatuses and techniques enabling automatic emergency braking (AEB) for a path-crossing target are described with reference to the following drawings.

The same numbers are used throughout the drawings to reference like features and components.

DETAILED DESCRIPTION

Overview

AEB enables vehicles to determine that collisions with objects are imminent and provide braking forces to slow or stop the vehicles in an attempt to avoid the collisions. Conventional AEB activation is generally based on time-to-collision (TTC) estimates for targets. For example, in the case of a target that is crossing orthogonally, conventional AEB activation may be based on solving a quadratic equation based on dynamics of the host vehicle without any additional logic or contextual awareness. Often times, however, this leads to activation in low-risk situations (e.g., based on false-positive collision detection, such as when a conventional AEB function determines a collision is imminent but a human operator or an objective analysis would not). There are many situations where a driver is completely aware of a target but desires to operate a vehicle in a way that can trigger traditional AEB activation. For example, unnecessary AEB triggering can occur in some emergency situations (e.g., moving out of the way of an emergency vehicle, avoiding road debris) or other scenarios that still comply with normal rules of driving (e.g., a path-crossing target vehicle).

For example, consider a four-way intersection with stop signs where a host vehicle and a target vehicle have resumed traveling (e.g., after stopping) in orthogonal directions (e.g., one is traveling north/south and the other is traveling east/west). In a normal right of way scenario, assuming that the target vehicle stopped and resumed traveling prior to the host vehicle, the target vehicle may cross a path of the host vehicle in front of the host vehicle. In such situations, for instance, to maintain flow of traffic at busy intersections, a driver of the host vehicle will often enter the intersection intending on crossing just after the target vehicle (e.g., the host vehicle will traverse the intersection passing laterally past and near a rear bumper of the target vehicle). In doing so, a traditional AEB function is often activated because of the proximity of the target vehicle as it crosses the path of the host vehicle, even though the risk of collision is low. This can lead to unexpected vehicle movement that can cause driver frustration and a decreased passenger experience (e.g., from loud noises, lights, sudden braking forces) and/or cause risk of further collisions with other vehicles trying to cross the intersection with similar fluency and speed. Furthermore, by activating in low-risk situations, traditional AEB activation can cause drivers to lose faith in the technology overtime, which may lead to disabling of the AEB or causing positive warnings of serious collisions to be ignored.

Techniques and systems are described that enable AEB for a path-crossing target that may prevent low-risk situations or false positives from impacting a driving experience for a host vehicle and other vehicles in an environment. More specifically, a system or component of a host vehicle is described that is configured to receive an AEB activation signal, determine that an AEB activation signal is active, or otherwise determine that a collision between the host vehicle and a target that is crossing a path of the host vehicle is imminent. Responsive to determining that an acceleration of the vehicle is not at or above an acceleration threshold, the system or component is configured to allow the AEB activation signal or otherwise causes an AEB system of the vehicle to apply a braking force in an attempt to prevent the expected collision. Responsive to determining that the acceleration of the vehicle is at or above the acceleration threshold, the system or component is configured to determine whether a portion of the target is within a suppression zone of the vehicle. The system or component is also configured to allow the AEB activation signal or prevent, refrain, or otherwise not allow the AEB activation signal to cause a braking force to be applied by the AEB system in response to determining that the portion of the target is not within the suppression zone.

In some implementations, instead of not allowing the AEB activation signal, the system or component determines whether a collision location is toward a trailing edge of the target. Responsive to determining that the collision location is not toward the trailing edge of the target, the system or component allows the AEB activation signal or otherwise causes the AEB system to apply the braking force. In cases of determining that the collision location is toward the trailing edge of the target, the system or component may not allow the AEB activation signal or otherwise may not cause the AEB system to apply the braking force.

By accounting for acceleration of the host vehicle, a target position relative to a dynamic suppression zone, and optionally a collision location relative a trailing edge of the target in gauging a level of risk of collision, the techniques and systems described herein are able to accurately, and with computational simplicity, determine a false-positive AEB event given a current driving scenario and mitigate it appropriately for the conditions (e.g., by suppressing the AEB activation signal, by not activating the AEB system) rather than treating all potential collision threats equally. Doing so can reduce or prevent unwarranted or unwanted braking inputs to the host vehicle (or warnings/alerts of impending braking inputs), which can be unpleasant, distracting, uncomfortable, or annoying for drivers and passengers. Furthermore, the techniques and systems described herein ensure AEB can still function as intended in actual high-risk scenarios (e.g., when a driver is unaware, when the target is not far enough into the suppression zone, when a collision will occur without AEB).

Example Environment

Figure 1:
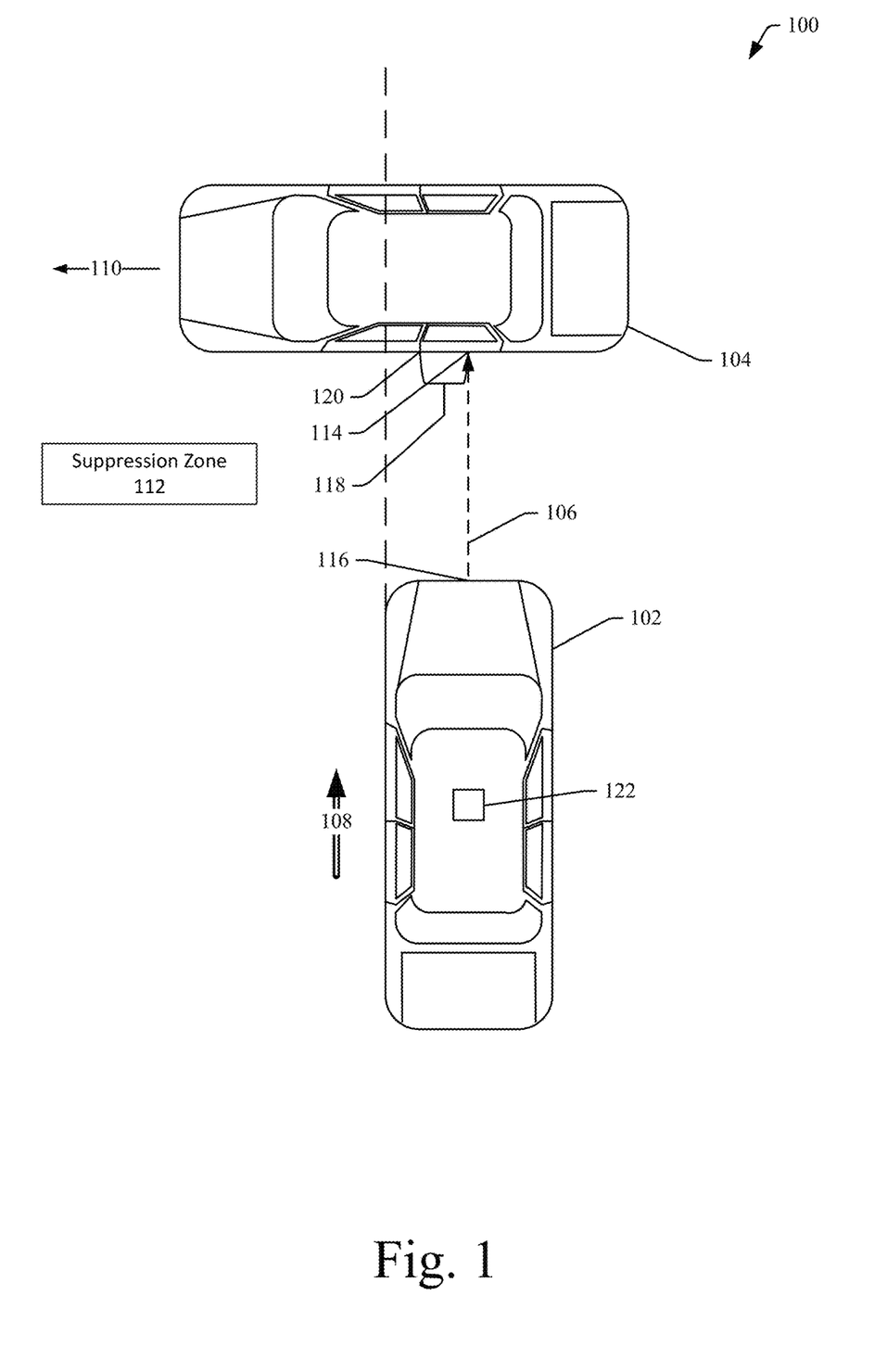
FIG. 1 illustrates an example environment where AEB for a path-crossing target may be used, in accordance with techniques of this disclosure.

FIG. 1 is an example illustration 100 of an example environment where AEB for a path-crossing target may be used. The example illustration 100 contains a host vehicle 102 and a target 104 that is crossing a path 106 of the host vehicle 102. Although shown as crossing the path 106 orthogonally, the target 104 may be crossing the path 106 at any angle. Although shown as an automobile, the host vehicle 102 may be any type of system with autonomous braking ability (car, truck, motorcycle, e-bike, boat, and so on). Although shown as an automobile, the target 104 may be any type of moving object (another car, truck, motorcycle, e-bike, or boat, pedestrian, cyclist, boulder, and so on).

The host vehicle 102 is accelerating at a host vehicle acceleration 108. The target 104 is crossing the path 106 with a transverse direction 110 (relative to the path 106) that is a binary determination. More specifically, the transverse direction 110 indicates whether the target 104 is traveling to the left or right relative to the path 106 (e.g., a transverse component of a velocity vector of the target 104 has a direction left or right of the path 106). For example, the transverse direction 110 is to the left of the path 106 in the example illustration 100 because the target 104 has a heading between 180 and 360 degrees relative to the path 106 (assuming a heading of the host vehicle 102 is at 0 degrees). If the target has a heading between 0 and 180 degrees in the same reference frame, then the transverse direction 110 is to the right of the path 106. Only a left/right determination is needed, as will be discussed below. It is also noted that the transverse direction 110 is relative to the path 106 at a location of the target 104. If the path 106 is curved, then the left/right determination is relative to the projected heading of the host vehicle 102 at the location of the target 104.

The transverse direction 110 determines which side of the host vehicle 102 a suppression zone 112 for the target 104 is on. For example, as shown, the suppression zone 112 is on the left of the host vehicle 102 because the transverse direction 110 is left. If the transverse direction 110 were right, then the suppression zone 112 is on the right of the host vehicle. The suppression zone 112 is a zone bounded by a line offset from the path 106 at a distance corresponding to a lateral extent of the host vehicle 102 (e.g., a side of a bounding box of a footprint of the host vehicle 102). In some implementations, the lateral extent of the host vehicle 102 may contain an added buffer from an actual extent of the host vehicle 102.

The techniques described herein assume that a potential collision exists between the host vehicle 102 and the target 104. The potential collision has a collision location 114 along the path 106 at the target 104. The collision location 114 may be based on where a center point of a leading edge (e.g., bumper) of the host vehicle is estimated to hit the target 104 (e.g., where center point 116 is estimated to hit the target 104). The collision location 114 may, in some implementations, be based on a corner or any other location of the leading edge of the host vehicle without departing from the scope of this disclosure. The collision location 114 is also at a distance 118 from a center point of the target 104 (e.g., center point 120) that may be used for AEB activation mitigation.

The host vehicle includes an AEB module 122 that is implemented at least partially in hardware (e.g., a machine-readable code executing on a processor) and configured to suppress or allow AEB activation based on the potential collision. For example, the AEB module 122 may receive (e.g., from another module, function, or system) or generate an AEB activation signal. The AEB activation signal is indicative of the potential collision and may be based on the attributes of the environment discussed above or other factors (e.g., a distance between the host vehicle 102 and the target 104, a velocity of the host vehicle 102, a velocity of the target 104, an acceleration of the target 104, braking capabilities of the host vehicle 102).

The AEB module 122 uses the host vehicle acceleration 108, the transverse direction 110, and optionally the collision location 114 to determine whether to allow or not allow AEB activation based on the potential collision. Allowing AEB activation generally causes an alert (audible, visual, etc.) and/or an AEB system of the host vehicle 102 to apply a braking force to slow the host vehicle 102. In some implementations, the AEB activation may comprise allowing or generating the AEB activation signal. Not allowing AEB activation does not cause the alert or the AEB system to apply the braking force. For example, the AEB module 122 may cancel, suppress, change a bit associated with, or otherwise not allow the AEB activation signal to pass to, or activate, the AEB system or a warning system associated with the AEB system.

By utilizing the techniques described herein, the host vehicle 102 is able to mitigate or obviate a common false-positive AEB activation in crossing scenarios. In doing so, an unnecessary warning or automatic application of brakes may be avoided, which is advantageous for a driver or passengers of the host vehicle 102 as well as surrounding people (e.g., other drivers will not think that the host vehicle 102 is driving erratically). Furthermore, trust in such systems by those individuals may be increased.

Example System

Figure 2:
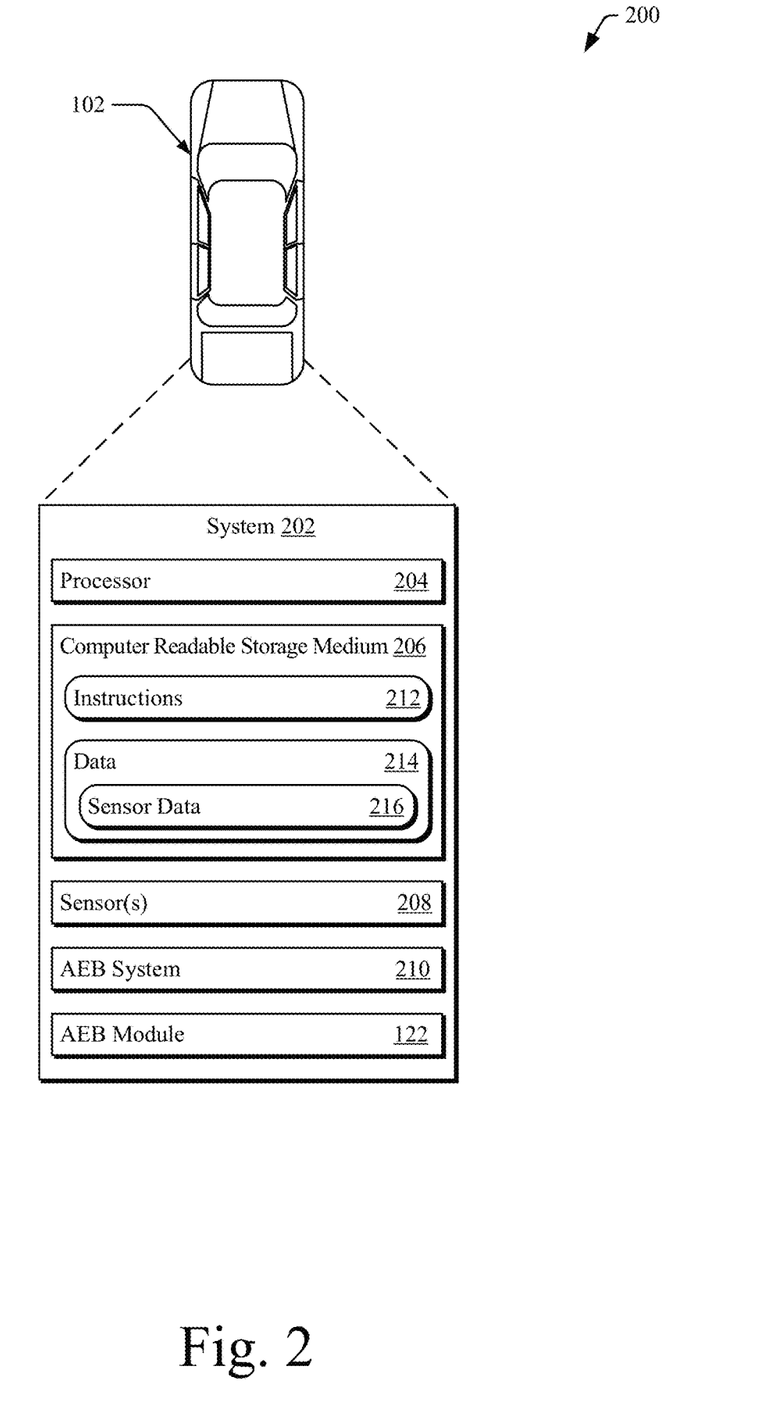
FIG. 2 illustrates an example system configured to perform AEB for a path-crossing target, in accordance with techniques of this disclosure.

FIG. 2 is an example illustration 200 of a system 202 in which AEB for a path-crossing target can be implemented. As shown, the system 202 may be implemented in the host vehicle 102. As shown underneath, the system 202 may include at least one processor 204, at least one computer-readable storage medium 206, one or more sensors 208, an AEB system 210, and the AEB module 122.

The processor 204 (e.g., an application processor, microprocessor, digital-signal processor (DSP), control unit, controller) executes instructions 212 (e.g., code) stored within the computer-readable storage medium 206 (e.g., a non-transitory storage device such as a hard drive, SSD, flash memory, read-only memory (ROM), erasable programmable read-only memory (EPROM), electrically-erasable programmable read-only memory (EEPROM)), to cause the system 202 to perform the techniques described herein. The instructions 212 may be part of a vehicle operating system and/or one or more applications comprised by the system 202.

The instructions 212 cause the system 202 to act upon (e.g., create, receive, modify, delete, transmit, display) data 214 (e.g., application data, module data, sensor data 216 from sensors 208, I/O data). Although shown as being within the computer-readable storage medium 206, portions of the data 214 may be within a random-access memory (RAM) or a cache of the system 202 (not shown). Furthermore, the instructions 212 and/or the data 214 may be remote to the system 202.

The AEB module 122 (or portions thereof) may be comprised by the computer-readable storage medium 206 or be a stand-alone component (e.g., executed in dedicated hardware in communication with the processor 204 and computer-readable storage medium 206). For example, the instructions 212 may cause the processor 204 to implement or otherwise cause the AEB module 122 to receive the sensor data 216 and implement the described AEB techniques. Furthermore, the AEB module 122 may interface with an existing AEB module or system (e.g., OEM AEB module), such that the AEB module 122 sits between the existing AEB module or system and the AEB system 210.

The sensors 208 provide the sensor data 216 that enables the determination of the attributes described in FIG. 1 (e.g., the path 106, the host vehicle acceleration 108, the transverse direction 110, the suppression zone 112, the collision location 114, the distance 118, the center point 120). For example, the sensors 208 may comprise a ranging sensor (e.g., radar) or optical sensor (e.g., camera) to indicate the transverse direction 110, the suppression zone 112, the collision location 114, the distance 118, or the center point 120. An accelerometer may be implemented to indicate the host vehicle acceleration 108.

In some implementations, the sensors 208 may comprise instructions that interface with another module or system of the host vehicle 102 to determine the attributes described in FIG. 1. For example, the sensors 208 may comprise instructions to receive the host vehicle acceleration 108 from an airbag module or vehicle dynamics module that contains an accelerometer.

Furthermore, in some implementations, the sensors 208 may comprise instructions to receive information from the target 104 via a communication system (not shown). For example, a vehicle-to-vehicle communication system may be used to obtain the transverse direction 110.

The AEB system 210 may be any type of system configured to apply braking forces to slow the host vehicle 102 in combination with, or in lieu of, driver input. For example, the AEB system may be a hydraulic, pneumatic, or electric braking system or some combination thereof that receives an activation signal and applies braking forces based on the activation signal.

By using the systems described herein, the AEB system 210 may not be activated in false-positive situations where conventional AEB is activated. In doing so, the system 202 is able to prevent unnecessary braking inputs, which may be better for both drivers' and passengers' comfort and safety.

Example Data Flow

Figure 3:
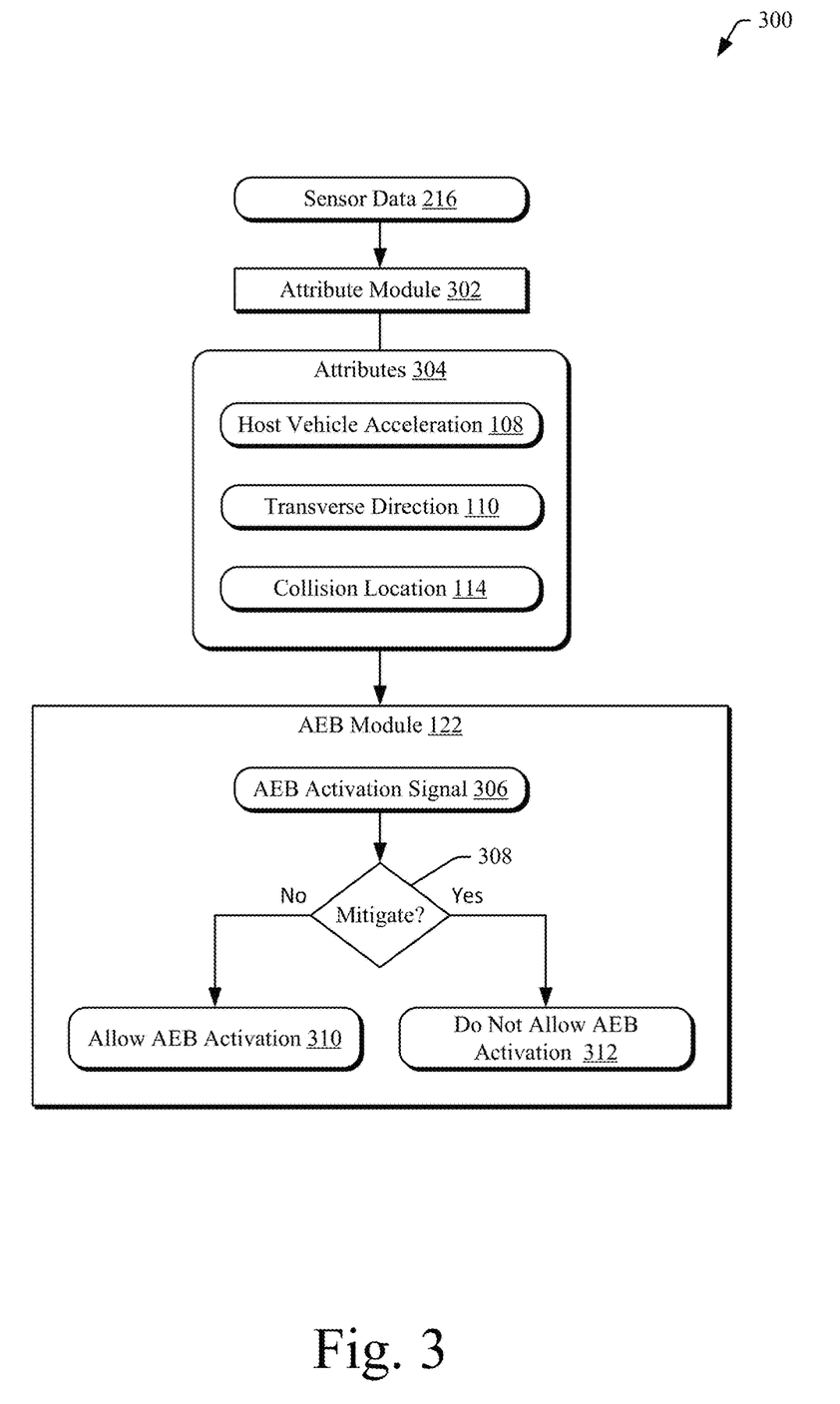
FIG. 3 illustrates an example process for AEB for a path-crossing target, in accordance with techniques of this disclosure.

FIG. 3 is an example illustration 300 of a data flow and actions for AEB for a path-crossing target. The example illustration 300 is generally comprised by the system 202. Various other entities, however, may perform one or more of the actions described below.

The example illustration 300 starts with the sensor data 216 being received as an input to an attribute module 302. The attribute module 302 may be part of the AEB module 122 or separate from the AEB module 122. The attribute module 302 uses the sensor data 216 to determine attributes 304 of the host vehicle 102 and the target 104, including those discussed in regard to FIG. 1. For example, the attributes 304 may comprise the host vehicle acceleration 108, the transverse direction 110, and the collision location 114. Some of the attributes 304 may be directly determined from the sensor data 216 (e.g., the host vehicle acceleration 108), and some of the attributes 304 may be derived from the sensor data 216 (e.g., the transverse direction 110 and/or collision location 114 may be determined from ranging or optical data). Regardless of how the attributes 304 are determined, derived, or calculated, the attribute module 302 is configured to output the attributes 304. If the attribute module 302 is implemented separately from the AEB module 122, then the attributes 304 are received by the AEB module 122.

The AEB module 122 also receives an AEB activation signal 306. The AEB activation signal 306 may be generated internally (e.g., the AEB module 122 determines that a collision is imminent and generates the AEB activation signal), or the AEB activation signal 306 may be received from another module or system (e.g., an AEB activation module, OEM module or system). Regardless of where it is generated, the AEB activation signal 306 is indicative of a potential collision with the target 104 and may be configured to activate the AEB system 210. For example, the AEB activation signal 306 may be based on a TTC to the target 104. In some implementations, the AEB activation signal 306 may comprise a decision from a previous decision block, code, or module, a bit or register value, or any other indication of the potential collision.

At 308, a decision is made as to whether to mitigate AEB activation. If the decision is to allow AEB activation (e.g., at 310), then the AEB module 122 may cause activation of the AEB system 210 to slow the host vehicle 102. If the decision is to not allow AEB activation (e.g., at 312), then the AEB module 122 may not cause activation of the AEB system 210.

In some implementations, the allowance of AEB activation (e.g., at 310) may include allowing the AEB activation signal 306 to cause the AEB system 210 to activate (e.g., by sending or otherwise allowing the AEB activation signal 306 to reach the AEB system 210). Conversely, the non-allowance of the AEB activation (e.g., at 312) may comprise preventing the AEB activation signal 306 from activating the AEB system 210 (e.g., by canceling, suppressing, refraining, changing a bit associated with, or otherwise nulling the AEB activation signal 306).

In other implementations where the AEB activation signal 306 is not configured to activate the AEB system 210 (e.g., it is a decision from a previous decision block or module), the allowance/non-allowance of AEB (e.g., at 310/312) may comprise generating or not generating an AEB activation signal 306 that is configured to activate the AEB system 210. In other words, if the AEB module 122 is responsible for generating the AEB activation signal 306 (or otherwise indicating a potential collision), then the AEB module 122 may, at 310, generate the AEB activation signal 306 and output it for receipt by the AEB system 210. Conversely, if the determination is to not allow AEB activation, the AEB module 122 may, at 312, not generate the AEB activation signal 306 configured to active the AEB system 210. In such implementations, the techniques described herein may comprise additional decisions (e.g., on top of a TTC calculation) for generating the AEB activation signal 306 configured to activate the AEB system 210.

Depending on the implementation, the techniques described herein may act as a gate (e.g., a go or no-go) for an AEB activation signal 306 that is configured to activate the AEB system 210 or as improved techniques of generating the AEB activation signal 306 that is configured to activate the AEB system 210. In this way, false-positive AEB activation may be mitigated or AEB activation signals 306 not generated during false-positive AEB events. In other words, the techniques enable gating of the AEB activation signal 306 to more precisely control whether the AEB system 210 is activated.

Allowance or Non Allowance of AEB Activation

Figure 4:
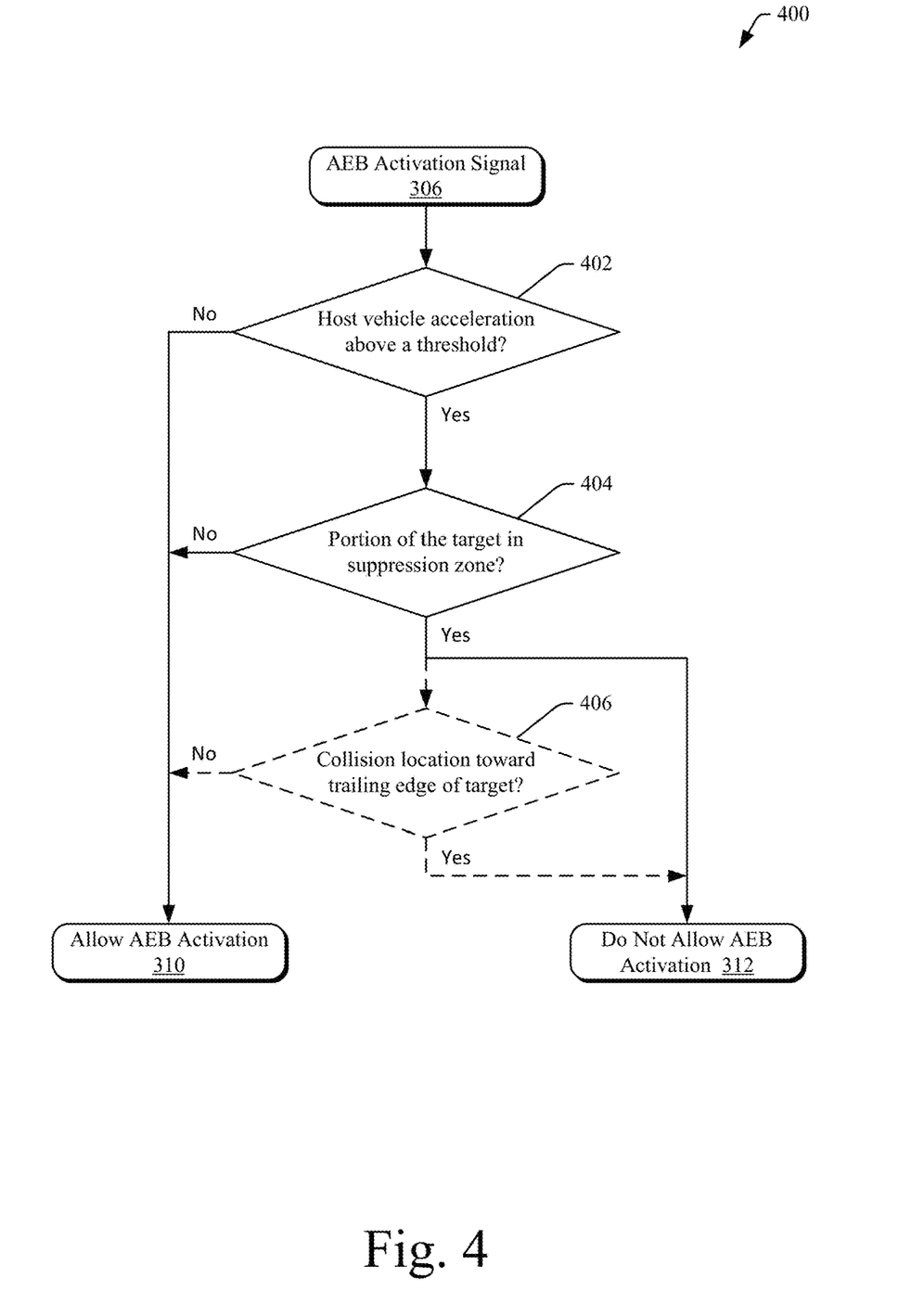
FIG. 4 illustrates an example process for the decision 308 of FIG. 3, in accordance with techniques of this disclosure.

FIG. 4 is an example illustration 400 of the decision 308 of FIG. 3. As stated above, the results of the decision 308 are gated to either allow AEB activation (e.g., at 310 by allowing the AEB activation signal 306 when it is configured to activate the AEB system 210 to reach the AEB system 210, by generating an AEB activation signal 306 configured to activate the AEB system 210) or to not allow AEB activation (e.g., at 312 by not allowing the AEB activation signal 306 when it is configured to activate the AEB system 210 to reach the AEB system 210, by not generating the AEB activation signal 306).

At decision 402, a determination is made as to whether the host vehicle acceleration 108 is above a threshold. The threshold may be based on an amount of acceleration that indicates that a driver of the host vehicle 102 is attentive (e.g., the driver sees the target 104 and wants to pass closely behind it). If the host vehicle acceleration 108 is not above the threshold, then the AEB module 122 may allow AEB activation (e.g., at 310). If, however, the host vehicle acceleration is above the threshold, then the AEB module 122 may continue to decision 404.

At decision 404, a determination is made as to whether a portion of the target 104 is within the suppression zone 112. As discussed above, the location of the suppression zone 112 is based on the transverse direction 110 of the target 104, the leading edge of the target 104, and the lateral extents of the host vehicle 102 projected to the collision location 114. In some cases, the suppression zone 112 includes a buffer or an offset relative the lateral extents and may, therefore, start or project out from near the lateral extents of the host vehicle 102. If the target 104 is not partially within the suppression zone 112, then the AEB module 122 may allow AEB activation (e.g., at 310). If, however, the target 104 is partially within the suppression zone 112, then the AEB module 122 may not allow AEB activation (e.g., at 312).

Decision 404, when viewed from the opposite perspective, determines if the target 104 is completely outside the suppression zone 112 (e.g., no portion of the target 104 is within the suppression zone 112). An assumption is that, if no portion of the target 104 is within the suppression zone 112, a driver of the host vehicle 102 may be miscalculating distance and/or location of the target 104. As such, AEB activation may be warranted.

It is noted that the AEB activation signal 306 (or an indication of a potential collision with the target 104) may not exist if the target 104 is entirely within the suppression zone 112. In other words, as shown in FIG. 1, if the target 104 is traveling left and is entirely within the suppression zone 112, then no potential collision exists.

In some implementations, if a portion of the target is within the suppression zone 112, the process may continue to decision 406. At 406, a determination is made as to whether the collision location 114 of the potential collision is toward a trailing edge of the target 104 (e.g., a rear bumper or right extent in FIG. 1). In order to do so, the AEB module 122 may determine transverse extents of the target 104 (e.g., a length of the target 104 when crossing at a right angle), determine the center point 120, and compare the collision location 114 to the center point 120. The determination may simply be based on whether the collision location 114 is between the center point 120 and the trailing edge. In some implementations, the determination may be based on the distance 118 (e.g., if a collision location threshold is more than 50% of the length of the target 104).

If the collision location 114 is not towards the trailing edge of the target 104 (e.g., the collision location 114 is within a front or leading half of the target 104), the AEB module 122 may allow the AEB activation (e.g., at 310). If, however, the collision location 114 is towards the trailing edge of the target 104, the AEB module 122 may not allow AEB activation (e.g., at 312).

By using the above techniques, information beyond TTC may be used to mitigate or obviate false-positive AEB activation. In this way, situations with little risk that may trigger conventional AEB can be navigated without activating AEB. By not activating AEB in these situations, unnecessary and often annoying warnings or braking inputs may be avoided.

Example Method

Figure 5:
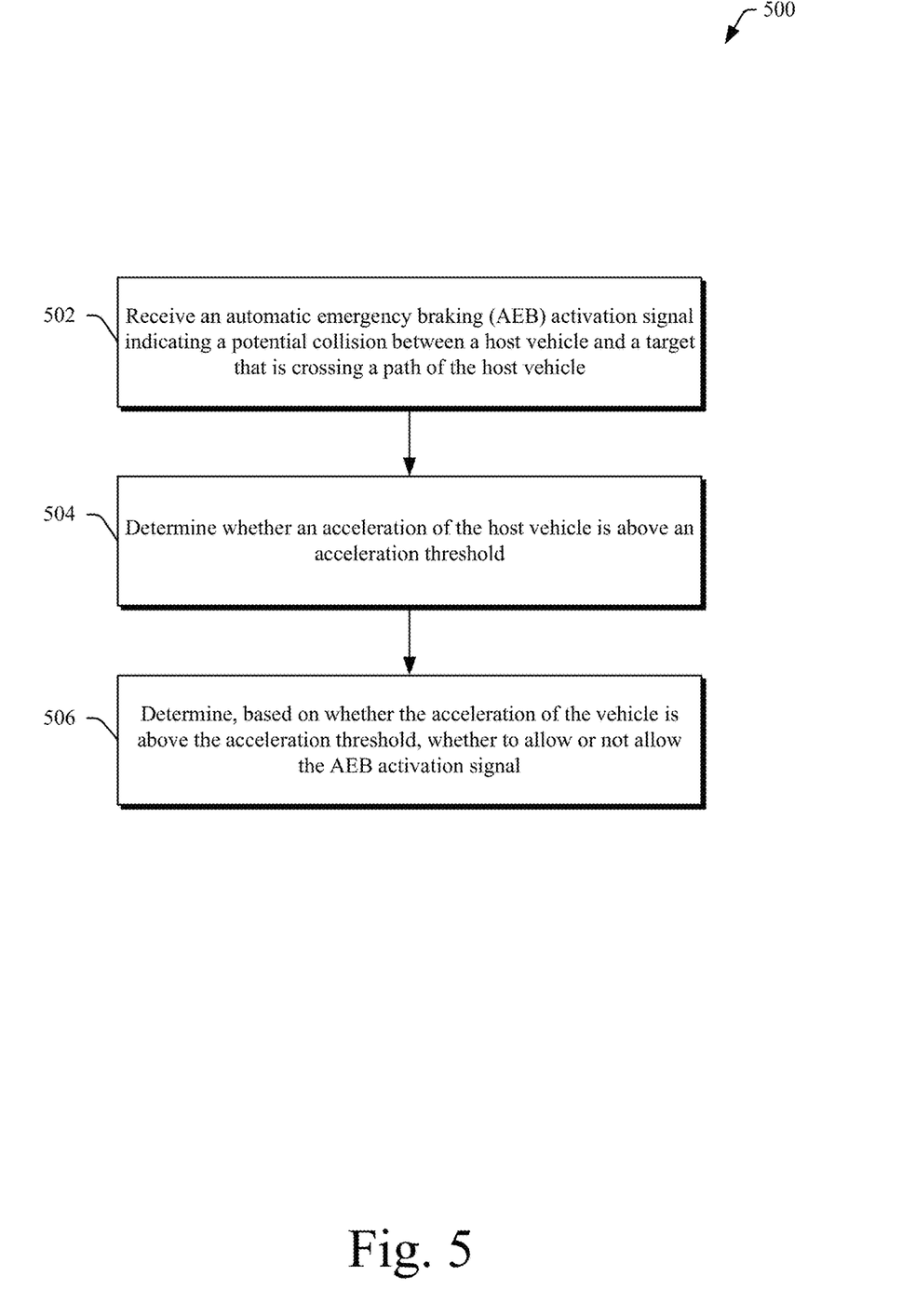
FIG. 5 illustrates another example process for AEB for a path-crossing target, in accordance with techniques of this disclosure.

FIG. 5 is an example illustration 500 of an example method for AEB for a path-crossing target. The example method may be implemented utilizing the previously described examples, such as the example environment of example illustration 100, the system 202, and the processes illustrated in example illustrations 300 and 400. Operations 502 through 506 may be performed by one or more entities of a vehicle (e.g., portions of the system 202 such as the AEB module 122). The order in which the operations are shown and/or described is not intended to be construed as a limitation, and any number or combination of the operations can be combined in any order to implement the example method or an alternate method.

At 502, an AEB activation signal is received, indicating a potential collision between a host vehicle and a target that is crossing a path of the host vehicle. For example, the AEB module 122 may generate the AEB activation signal 306 responsive to determining that a collision is imminent or receive the AEB activation signal 306 from another entity that generated the AEB activation signal 306 similarly. In some implementations, the receiving the AEB activation signal 306 may comprise the AEB module 122 determining a value of a bit or register associated with the AEB activation signal 306.

At 504, a determination is made as to whether an acceleration of the host vehicle is above an acceleration threshold. For example, the AEB module 122 may determine or receive the host vehicle acceleration 108 and compare it to the acceleration threshold that is indicative of driver attention.

At 506, a determination is made as to whether to allow or not allow the AEB activation signal based on whether the acceleration of the host vehicle is above the acceleration threshold. For example, the AEB module 122 may allow the AEB activation signal 306 to cause the AEB system 210 to activate responsive to determining that the host vehicle acceleration 108 is not above the acceleration threshold. Conversely, the AEB module 122 may not allow the AEB activation signal 306 to cause the AEB system 210 to activate (e.g., by suppressing the AEB activation signal 306, changing a bit or register value associated with the AEB activation signal 306, or otherwise not allowing the AEB system 210 to receive the AEB activation signal 306) responsive to determining that the host vehicle acceleration 108 is above the acceleration threshold.

Optionally, other information may be used to determine whether to allow or not allow the AEB activation signal. For example, the AEB module 122 may determine or receive information regarding whether a portion of the target 104 is within the suppression zone 112. The AEB module 122 may also determine or receive information regarding whether the collision location 114 is toward a trailing edge of the target 104. The AEB module 122 may then determine whether to allow or not allow the AEB activation signal 306 based on the additional information.

In some implementations, machine-learned models or other techniques can be applied to improve the accuracy of the AEB module 122. Specifically, machine-learned models may be used in determining whether to allow or not allow the AEB activation signal 306. For example, the AEB module 122 may execute a neural network trained to evaluate lawful driving maneuvers at various locations and/or times of day to adjust or improve various acceleration thresholds and/or collision location thresholds that are used to determine when to allow or not allow the AEB activation signal 306.

By determining whether the acceleration of the host vehicle is above a threshold (and possibly whether a portion of the target is within the suppression zone or whether the collision location is toward a trailing edge of the target) in a path-crossing scenario, many common false-positive AEB events (warnings, alerts, and/or braking) can be avoided. Therefore, execution of the AEB module 122, as described herein, leads to better driver and passenger experiences through mitigation of unnecessary, and often unpleasant, braking events.

Examples

Example 1: A method comprising: receiving an automatic emergency braking (AEB) activation signal indicating a potential collision between a vehicle and a target that is crossing a path of the vehicle; determining whether an acceleration of the vehicle is above an acceleration threshold; and determining, based on whether the acceleration of the vehicle is above the acceleration threshold, whether to allow or not allow the AEB activation signal.

Example 2: The method as recited in example 1, wherein the acceleration threshold corresponds to an acceleration indicative of an attentive driver.

Example 3: The method as recited in example 1 or 2: further comprising determining whether a portion of the target is within a suppression zone of the vehicle; and wherein the determining whether to allow or not allow the AEB activation signal is based further on whether the portion of the target is within the suppression zone of the vehicle.

Example 4: The method as recited in example 3: further comprising determining a transverse direction of travel of the target relative to the path; and wherein the suppression zone is on a side of the vehicle that corresponds to the transverse direction of travel of the target.

Example 5: The method as recited in example 4, wherein the suppression zone starts near a lateral extent of the vehicle and extends in the transverse direction of travel of the target.

Example 6: The method as recited in any of examples 1 to 5: further comprising, determining whether a collision location of the potential collision is toward a trailing edge of the target; and wherein the determining whether to allow or not allow the AEB activation signal is further based on whether the collision location of the potential collision is closer to a trailing edge of the target than a leading edge of the target.

Example 7: The method as recited in example 6, wherein the determining whether the collision location is closer to the trailing edge of the target comprises determining whether the collision location is between the trailing edge and a mid-point of the target.

Example 8: The method as recited in example 6 or 7, wherein the determining whether the collision location is toward the trailing edge of the target is based on a mid-point on a leading edge of the vehicle.

Example 9: The method as recited in any of examples 1 to 8, further comprising, responsive to determining to allow the AEB activation signal, allowing the AEB activation signal to cause an AEB system of the vehicle to apply a braking force to slow the vehicle.

Example 10: The method as recited in any of examples 1 to 8, further comprising, responsive to determining to not allow the AEB activation signal, one or more of: canceling the AEB activation signal, preventing an AEB system of the vehicle from applying a braking force to slow the vehicle, or preventing the AEB activation signal from reaching the AEB system.

Example 11: The method as recited in any of examples 1 to 10, further comprising generating the AEB activation signal.

Example 12: The method as recited in example 11: further comprising determining a time-to-collision (TTC) between the vehicle and the target; and wherein the generating the AEB activation signal is based on the TTC between the vehicle and the target.

Example 13: A system comprising: at least one processor configured to: receive an automatic emergency braking (AEB) activation signal indicating a potential collision between a vehicle and a target that is crossing a path of the vehicle; determine an acceleration of the vehicle; and responsive to a determination that the acceleration of the vehicle is not above an acceleration threshold, allowing the AEB activation signal; or responsive to a determination that the acceleration of the vehicle is above the acceleration threshold: determine whether a portion of the target is within a suppression zone of the vehicle; and responsive to a determination that the portion of the target is within the suppression zone, not allow the AEB activation signal; or responsive to a determination that the portion of the target is not within the suppression zone, allow the AEB activation signal.

Example 14: The system as recited in example 13, wherein the acceleration threshold corresponds to an acceleration indicative of an attentive driver.

Example 15: The system as recited in example 13 or 14, wherein: the processor is further configured to determine a transverse direction of travel of the target; and the suppression zone is on a side of the vehicle that corresponds to the transverse direction of travel of the target.

Example 16: The system as recited in example 15, wherein the suppression zone starts near a lateral extent of the vehicle and extends in the transverse direction of travel of the target.

Example 17: The system as recited in any of examples 13 to 16, wherein the allowing the AEB activation signal causes an AEB system of the vehicle to apply a braking force to slow the vehicle.

Example 18: The system as recited in any of examples 13 to 16, wherein the not allowing the AEB signal comprises one or more of: canceling the AEB activation signal, preventing an AEB system of the vehicle from applying a braking force to slow the vehicle, or preventing the AEB activation signal from reaching the AEB system.

Example 19: The system as recited in any of examples 13 to 18, wherein the processor is further configured to: determine a time-to-collision (TTC) between the vehicle and the target; and generate the AEB activation signal based on the TTC between the vehicle and the target.

Example 20: The system as recited in any of examples 13 to 19, wherein the system is configured to be disposed in the vehicle.

Example 21: A method comprising: determining that a collision with a target that is crossing a path of a vehicle is imminent; determining whether an acceleration of the vehicle is above a threshold; and determining whether to activate an automatic emergency braking (AEB) system of the vehicle based on the determining whether the acceleration of the vehicle is above the threshold.

Example 22: The method as recited in example 21: further comprising determining whether a portion of the target is within a suppression zone of the vehicle; and wherein the determining whether to activate the AEB system is based further on the determining whether the portion of the target is within the suppression zone of the vehicle.

Example 23: The method as recited in example 21 or 22: further comprising determining whether a collision location is toward a trailing edge of the target; and wherein the determining whether to activate the AEB system is based further on the determining whether the collision location is toward the trailing edge of the target.

Example 24: The method as recited in any of examples 21 to 23, wherein the determining that the collision with the target is imminent comprises: determining a time-to-collision (TTC) between the vehicle and the target; and comparing the TTC to a TTC threshold.

Example 25: The method as recited in any of examples 21 to 24, wherein the determining whether to activate the AEB system comprises determining whether to generate an AEB activation signal for receipt by the AEB system.

Example 26: At least one non-transitory computer-readable storage medium comprising instructions configured to cause at least one processor to: receive an automatic emergency braking (AEB) activation signal indicating a potential collision between a vehicle and a target that is crossing a path of the vehicle; determine an acceleration of the vehicle; and responsive to a determination that the acceleration of the vehicle is not above an acceleration threshold, allowing the AEB activation signal; or responsive to a determination that the acceleration of the vehicle is above the acceleration threshold: determine whether a portion of the target is within a suppression zone of the vehicle; and responsive to a determination that the portion of the target is within the suppression zone, not allow the AEB activation signal; or responsive to a determination that the portion of the target is not within the suppression zone, allow the AEB activation signal.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
    receiving an automatic emergency braking (AEB) activation signal indicating a potential collision between a vehicle and a target that is crossing a path of the vehicle;
    determining whether an acceleration of the vehicle is above an acceleration threshold;
    responsive to a determination that the acceleration of the vehicle is above the acceleration threshold, determine whether a portion of the target is within a suppression zone of the vehicle; and
    responsive to a determination that the portion of the target is not within the suppression zone, allow the AEB activation signal effective to cause an AEB system of the vehicle to apply a braking force to slow the vehicle.

2. The method as recited in claim 1, wherein the acceleration threshold corresponds to an acceleration indicative of an attentive driver.

3. The method as recited in claim 1:
    further comprising determining a transverse direction of travel of the target relative to the path; and
    wherein the suppression zone is on a side of the vehicle that corresponds to the transverse direction of travel of the target.

4. The method as recited in claim 3, wherein the suppression zone starts at a lateral extent of the vehicle and extends in the transverse direction of travel of the target.

5. The method as recited in claim 1:
    further comprising, determining a collision location of the potential collision relative to the target; and
    wherein the allowing the AEB signal is further responsive to a determination that the collision location of the potential collision is not between a trailing edge of the target and a mid-point of the target.

6. The method as recited in claim 5, wherein the collision location is based on a mid-point on a leading edge of the vehicle.

7. The method as recited in claim 1, further comprising generating the AEB activation signal.

8. The method as recited in claim 7:
    further comprising determining a time-to-collision (TTC) between the vehicle and the target; and
    wherein the generating the AEB activation signal is based on the TTC between the vehicle and the target.

9. A system comprising:
    at least one processor configured to:
        receive an automatic emergency braking (AEB) activation signal indicating a potential collision between a vehicle and a target that is crossing a path of the vehicle;
        determine an acceleration of the vehicle; and
        responsive to a determination that the acceleration of the vehicle is not above an acceleration threshold, allowing the AEB activation signal effective to cause an AEB system of the vehicle to apply a braking force to slow the vehicle; and
        responsive to a determination that the acceleration of the vehicle is above the acceleration threshold:
            determine whether a portion of the target is within a suppression zone of the vehicle; and
            responsive to a determination that the portion of the target is within the suppression zone, not allow the AEB activation signal; and
            responsive to a determination that the portion of the target is not within the suppression zone, allow the AEB activation signal effective to cause the AEB system to apply the braking force to slow the vehicle.

10. The system as recited in claim 9, wherein the not allowing the AEB signal comprises one or more of: canceling the AEB activation signal, preventing the AEB system from applying the braking force to slow the vehicle, or preventing the AEB activation signal from reaching the AEB system.

11. The system as recited in claim 9, wherein the acceleration threshold corresponds to an acceleration indicative of an attentive driver.

12. The system as recited in claim 9, wherein:
    the processor is further configured to determine a transverse direction of travel of the target; and
    the suppression zone is on a side of the vehicle that corresponds to the transverse direction of travel of the target.

13. The system as recited in claim 12, wherein the suppression zone starts at a lateral extent of the vehicle and extends in the transverse direction of travel of the target.

14. The system as recited in claim 9, wherein the processor is further configured to:
    determine a time-to-collision (TTC) between the vehicle and the target; and
    generate the AEB activation signal based on the TTC between the vehicle and the target.

15. The system as recited in claim 9, wherein the processor is further configured to, responsive to the determination that the portion of the target is within the suppression zone:
    determine a collision location of the potential collision relative to the target; and
        responsive to a determination that the collision location is between a midpoint of the target and a trailing edge of the target, not allow the AEB activation signal; and
        responsive to a determination that the collision location is not between the midpoint of the target and the trailing edge of the target, allow the AEB activation signal.

16. The system as recited in claim 15, wherein the collision location is based on a midpoint on a leading edge of the vehicle.

17. The system as recited in claim 9, wherein the processor is further configured to generate the AEB signal.

18. At least one non-transitory computer-readable storage medium comprising instructions configured to cause at least one processor to:

receive an automatic emergency braking (AEB) activation signal indicating a potential collision between a vehicle and a target that is crossing a path of the vehicle;

determine an acceleration of the vehicle; and
    responsive to a determination that the acceleration of the vehicle is not above an acceleration threshold, allowing the AEB activation signal effective to cause an AEB system of the vehicle to apply a braking force to slow the vehicle; and     responsive to a determination that the acceleration of the vehicle is above the acceleration threshold:
        determine whether a portion of the target is within a suppression zone of the vehicle; and
        responsive to a determination that the portion of the target is within the suppression zone, not allow the AEB activation signal; and
        responsive to a determination that the portion of the target is not within the suppression zone, allow the AEB activation signal effective to cause the AEB system to apply the braking force to slow the vehicle.

19. The non-transitory computer-readable storage medium as recited in claim 18, wherein:
the instructions further cause the processor to determine a transverse direction of travel of the target; and
the suppression zone is on a side of the vehicle that corresponds to the transverse direction of travel of the target.

20. The non-transitory computer-readable storage medium as recited in claim 19, wherein the suppression zone starts at a lateral extent of the vehicle and extends in the transverse direction of travel of the target.

\* \* \* \* \*